Aug. 11, 1936.  M. N. DAVIS ET AL  2,050,486
APPARATUS FOR TESTING THE SMOOTHNESS OF PAPER
Filed Aug. 1, 1934
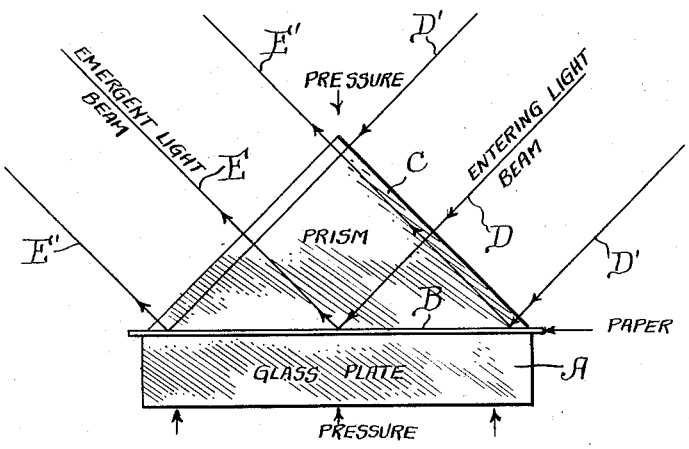
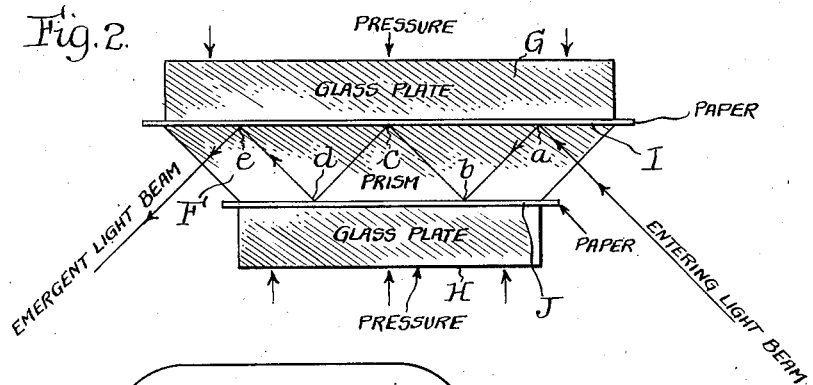
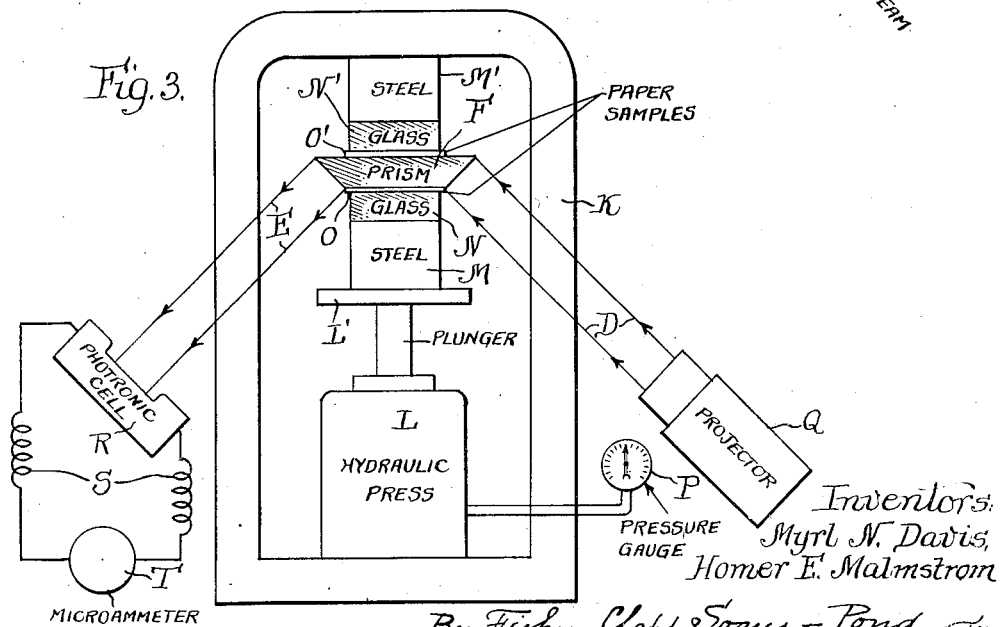
Inventors:
Myrl N. Davis,
Homer E. Malmstrom
By Fisher, Clapp, Soans + Pond
Attys Patented Aug. 11, 1936

2,050,486

UNITED STATES PATENT OFFICE 2,050,486

APPARATUS FOR TESTING THE SMOOTHNESS OF PAPER

Myrl N. Davis and Homer E. Malmstrom, Appleton, Wis., assignors to Paper Patents Company, Neenah, Wis., a corporation of Wisconsin Application August 1, 1934, Serial No. 737,967

3 Claims. (Cl. 88—14)

This invention relates to the art of optical testing appliances, and has reference more particularly to apparatus for testing the smoothness of paper surfaces, being designed primarily for testing papers used in printing.

The principle of optics on which the invention is based will be best understood by first outlining a few known facts relating to the behavior of a ray of light when encountering at an acute angle an interface between two optically transparent media of different indices of refraction.

When a ray of light strikes at an acute angle an interface between two optically transparent media of different indices of refraction, the question of whether or not the light will pass the interface can be answered only if we know—

(1) The angle I between the ray and the normal to the interfacial surface, (2) The ratio $$\frac{N_2}{N_1}$$

of the two indices of refraction. The ray will pass the interface only if the relationship Sin I is equal to or less than $$\frac{N_2}{N_1}$$

is satisfied, i. e. if the second medium has a higher index of refraction than the first or in case the reverse is true, if the angle I is sufficiently small (sufficiently near perpendicular incidence). In every case for which the above relationship is not satisfied the light ray will be totally reflected at the interface, penetrating the second medium not at all. For instance, light will pass from glass (with an index of refraction of 1.53) into air only if the angle of incidence be less than 40° 51'. If the air were to be replaced by water, the light ray would enter the water if the angle of incidence be less than 60° 21', being totally reflected back into the glass for all greater angles of incidence.

Applying these known facts to the equipment employed in carrying out the present invention, and first assuming a very simple and elementary form of such equipment, assume that we have a right angle glass prism the two rectangular sides of which are of equal width. If we let a beam of parallel light enter one of the short legs of the prism in a direction normal to the face of incidence, the light will be incident at an angle of 45° on the face forming the hypotenuse of the triangle. If this face be clean and in contact only with air the beam of light will be totally reflected within the glass and will leave the prism in a direction normal to the second short face. Such a prism is frequently used to change the direction of a beam of light by 90°.

Suppose now that we press a sheet of paper against that face of the prism forming the hypotenuse. Allowing our beam of light to enter the prism just as before, wherever the paper is in good optical contact with the glass the change in index of refraction from glass to paper will be much less than that from glass to air. The conditions for total reflection will no longer be satisfied and light will escape from the glass into the paper. Wherever the paper is not in optical contact with the glass total reflection will continue to occur, the light emerging from the prism just as if the paper were not in position against the reflecting face of the totally reflecting prism, and will constitute the only light left in the totally reflected beam except for such light as may be scattered by the paper in that particular direction (this can be only a very small fraction of the total light entering the paper). The totally reflected beam will accordingly be reduced in intensity by a factor given almost exactly by the ratio of the illuminated area not in optical contact with the paper surface to the total illuminated area of the totally reflecting face of the prism.

If means be provided for measuring the pressure applied between the paper and the glass surfaces and for measuring the intensity of the light in the totally reflected beam, it is possible to determine, for any given pressure, the fraction which tells the percentage of the paper surface which is actually in good optical contact with the glass. This fraction should serve as a measure of the smoothness of the paper surface at the pressure in question.

Such a measurement will, of course, give no indication of the shape of the areas of paper in contact with the glass or of the depth of "holes" in the paper surface except as the bottoms of the "holes" be brought into optical contact with the glass as the pressure is increased.

The shape and frequency of the areas of paper in contact with the prism face can be observed visually by peering into the face of the prism through which the light enters. Wherever the paper and glass are in good contact the light scattered by the paper, in such a direction as to reach the eye of the observer, will be sufficient clearly to outline the contact area, since no light will be scattered back from areas over which no contact exists between glass and paper, such areas appearing dark.

Simple forms of apparatus for carrying out the invention are illustrated, mostly diagrammatically, in the accompanying drawing, in which—

Fig. 1 shows the simplest form of the equipment above described, means for applying and measuring the pressure not being illustrated.

Fig. 2 shows a form that includes a special prism of sufficient diameter or length, relative to its thickness, between the points of light entrance and emergence on its beveled edges to permit a plurality of successive reflections at paper-glass interfaces before the intensity of the emergent beam is measured.

Fig. 3 is a side elevation of a simple form of apparatus that has been used by us, including means for applying and measuring pressure, and means for measuring the light intensity of the emergent beam.

In the simple embodiment of the principle of the invention pictured in Fig. 1, A is a flat glass plate that forms a support for a sheet B of paper whose surface smoothness is to be determined, and C is a glass block in the form of a right angle prism, the hypotenuse side of which rests on the paper B. Pressure is applied between the plate A and prism C, to any predetermined extent by means not shown. D and D' indicate the central and boundary lines of an entering light beam, and E and E' the corresponding lines of the reflected emergent light beam.

In the form shown in Fig. 2, a prism F in the form of a truncated portion of a 90 degree wedge-shaped glass block is mounted between upper and lower flat glass plates G and H, the prism F being of sufficient diameter or length, relative to its thickness, between the points of light entrance and emergence on its beveled edges, to permit a plurality of successive reflections a, b, c, d and e at the two paper-glass interfaces I and J. This multiple reflecting prism affords a very material increase in sensitivity, and the prism itself is much less liable to mechanical injury since the distribution of strains is more uniform.

In Fig. 3, which outlines a complete apparatus, K designates a hollow upright rectangular frame, on the bottom limb of which is mounted an hydraulic press L. On the plunger L' of the press is a steel block M, on which, in turn is seated a glass plate N. On glass plate N rests a sample O of paper to be tested, and on this sample is placed a prism F preferably like the prism F of Fig. 2. A second paper sample O' seats on the prism F, and surmounting this are a glass plate N' and steel block M', the latter abutting the top limb of frame K. The press L is furnished with a pressure gauge P. A projector Q directs an entering light beam D against and normal to one beveled edge of prism F, and from the opposite edge the emergent beam E is directed onto a Weston photronic cell R connected by leads S to a microammeter T.

With this equipment, the procedure of making smoothness measurements is as follows:

The strips of paper O and O' to be tested are inserted between the two parallel totally reflecting faces of the prism F and the adjacent glass pressure transmitting plates N and N'. Care is taken to insure that either the wire sides or the felt sides of the two strips are next to the totally reflecting faces of the prism, depending on whether wire or felt side smoothnesses are to be measured.

The plunger L' of press L is then raised until the various adjacent surfaces are in the approximate positions they will assume under pressure.

At a zero pressure reading on gauge P the intensity of the emergent light beam after passing through the totally reflecting prism (for example, in the manner shown in Fig. 2) is determined by reading the microammeter T, and noted.

The pressure is then raised to any desired or predetermined value P', and the microammeter is again read and its indication noted.

The reading obtained at pressure P' is divided by that obtained at zero pressure in order to eliminate the effect of variations in initial light intensity, and the quotient is taken as the smoothness index for pressure P'.

Of course, if it be desired to determine the relationship between the smoothness index and the pressure, the last two described operations may be repeated as often as necessary to secure the required data.

It is obvious that the smoothness index obtained when using a five reflection prism will be different from that obtained when a three or a one reflection prism is used. The procedure followed would, of course, be similar if the lesser number of reflections were employed.

The use of an hydraulic press for applying the pressures is, of course, only one of numerous pressure creating means that might be employed. It is essential only that controllable and known pressures be available. In the work we have done thus far, pressures from 0 to 11,000 pounds per square inch have been tried. It seems likely that pressures less than 1,000 pounds per square inch will be the only ones of practical interest in connecting measured smoothness with printing quality.

We claim:

1. Apparatus for measuring the smoothness of a paper surface, comprising a glass block having a light reflecting base surface on which a paper sheet to be tested is laid and oppositely beveled edges each at an angle of 45 degrees to said base surface, means for pressing said sheet on said base surface, means for projecting a light beam normal to one of said beveled edges through said block onto the paper-glass interface, and means for measuring the intensity of the reflected beam of light emerging from the other of said beveled edges.

2. Apparatus for measuring the smoothness of paper surfaces, comprising a truncated portion of a 90 degree wedge-shaped glass block having top and bottom parallel light reflecting surfaces on which paper sheets to be tested are laid and oppositely beveled edges, means for applying equal opposed pressures to said sheets, means for projecting a light beam normal to one of said edges through said block onto the paper glass interfaces in a plurality of reflections within the block, and means for measuring the intensity of the reflected beam of light emerging from the other edge.

3. Apparatus for measuring the smoothness of paper surfaces, comprising a truncated portion of a 90 degree wedge-shaped glass block having top and bottom parallel light reflecting surfaces on which paper sheets to be tested are laid and oppositely beveled edges, means for applying equal opposed pressures to said sheets, means for measuring the pressure applied, a projector for directing a light beam normal to one of said edges through said block onto the paper glass interfaces in a plurality of successive reflections within the block, a photronic cell onto which the light beam emerging from the other edge is directed, and a microammeter wired to said cell.

MYRL N. DAVIS.
HOMER E. MALMSTROM.